Dec. 11, 1951
A. C. EKVALL
2,578,342
DEFLECTION COIL ASSEMBLY
Filed March 15, 1946
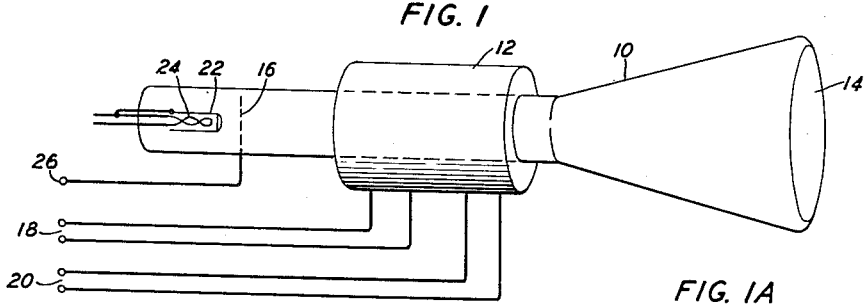
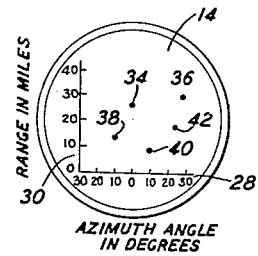
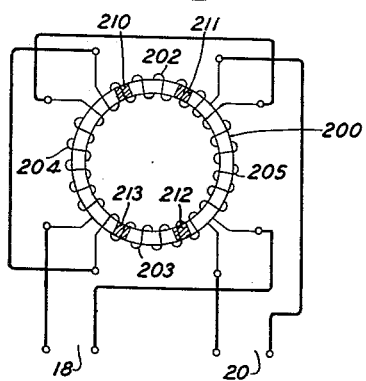
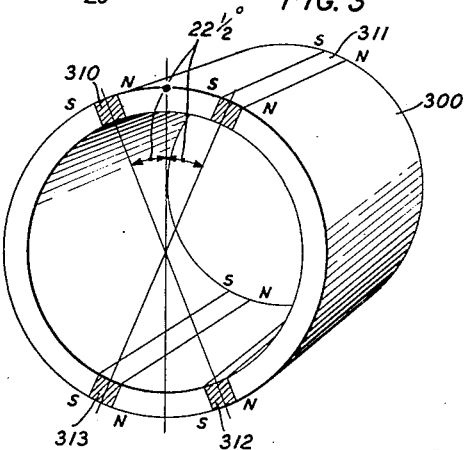
INVENTOR
A. C. EKVALL
BY
H. O. Wright
ATTORNEY Patented Dec. 11, 1951

2,578,342

UNITED STATES PATENT OFFICE 2,578,342

DEFLECTION COIL ASSEMBLY

Adolph C. Ekvall, Brooklyn, N. Y., assignor to Bell Telephone Laboratories, Incorporated, New York, N. Y., a corporation of New York Application March 15, 1946, Serial No. 654,555

5 Claims. (Cl. 313—79)

This invention relates to an improvement in toroidal type magnetic core deflection coil assemblies for cathode ray oscilloscopes. More particularly it relates to oscilloscopes in which it is desired that the normal position of the ray be displaced from the center of the screen by a predetermined amount in a preselected direction. Variable horizontal and vertical sweeping voltages are then applied to the deflecting coils of the oscilloscope to provide patterns of indications of the character, for example, which are known as class B or class C indications in the radar art.

In a class B indication, for example, the ray of the oscilloscope is swept horizontally in synchronism with a horizontal turning movement of the radar exploratory antenna to indicate the azimuthal direction of the antenna at each instant while the ray is swept vertically following each emitted radar exploratory pulse to indicate by vertical positions of received reflected pulses the respective ranges of objects from which reflected pulses are received. The reflected pulses are detected, amplified and applied to the control anode of the cathode ray oscilloscope to brighten the trace momentarily so that each reflecting object is represented by a brightened spot on the oscilloscope, the horizontal position of which represents its azimuth angle and the vertical position of which represents its range, azimuth angle and range both being with reference to the point at which the exploratory radar antenna is located. Such indications are described, for example, in the magazine "Radiocraft" at page 95, for November 1945 published by Radcraft Publications Inc., Springfield, Massachusetts. Also, by way of example, a class B indication is shown in Fig. 4 of copending application of C. B. H. Feldman, Serial No. 464,479 filed November 4, 1942, now United States Patent 2,419,205, granted April 22, 1947. The application discloses a radar system for obtaining the indication of Fig. 4.

In order to make effective use of the surface of the oscilloscope screen for such indications it is necessary to provide a bias or constant vertical downward deflection of the oscilloscope ray so that all range sweeps will start from a line at a substantial distance below the center of the screen. Such a bias has been provided, in the arrangements of the prior art, either by superimposing a bias voltage on the vertical deflecting windings or by employing a permanent magnet independently of the deflecting windings to produce the desired constant deflection. The use of a bias voltage on the vertical deflecting coils is objectionable because not only does this require the use of an additional direct current power supply but it also necessitates the use of means to effectively isolate the alternating current and direct current portions of the circuit from each other. The use of a permanent magnet independently of the deflecting windings is not convenient since the permanent magnet must be assembled over the deflecting coil assembly and adds substantially to the weight and bulk of the oscilloscope.

The above objections are overcome and a compact convenient unit, of lighter weight, less volume and inherently greater sensitivity, because of closer proximity to the electron beam, is obtained, in accordance with this invention, by providing permanent magnet inserts in the magnetic core upon which the deflecting coil windings are wound. For aircraft and portable radar equipments, for portable testing oscilloscopes and numerous other similar types of apparatus, a reduction in weight and volume is of especial importance and value. The increased inherent sensitivity is, of course, of value wherever a sensitive oscilloscope is desired.

Objects of the invention are accordingly to provide lighter, more compact and inherently more sensitive cathode ray oscilloscopes which are capable of producing class B, class C and similar indications.

Other and further objects will become apparent during the course of the following description and from the appended claims.

The principles of the invention will be more readily understood from the following description of a preferred illustrative embodiment and from the accompanying drawings in which:

Fig. 1 indicates diagrammatically an oscilloscope employing the invention;

Fig. 1A illustrates a type of indication provided by the oscilloscope of Fig. 1;

Fig. 2 illustrates diagrammatically the deflection coil assembly for the oscilloscope of Fig. 1; and Fig. 3 illustrates the construction of the core assembly for the deflection coil assembly.

In more detail in Fig. 1, a cathode ray oscilloscope tube 10 is provided, at its left end, with conventional accessories such as a cathode heater element 24, and a cathode and gun structure 22, which may be of any of the numerous forms well known to the art and may include one or more of each of several elements, such as focussing and accelerating electrodes. A ray control anode 16, electrically connecting to a terminal 26, is also provided for the purpose of controlling the intensity of the ray in accordance with conventional practice in the art.

At the right end of the neck of the tube 10 a deflection coil assembly 12, comprising a cylindrical toroidal core upon which four windings are situated, as will be described in greater detail in connection with Fig. 2, is located. Terminals 18 connect to the horizontal deflecting windings and terminals 20 connect to the vertical deflecting windings.

The cathode ray tube 10 expands toward its right end to provide a screen portion 14 of conventional type having a luminescent coating upon which brightened marks appear when a ray of sufficient intensity strikes the coating. A class B indication is illustrated in Fig. 1A as appearing on the screen and includes a horizontal azimuth angle scale 28 showing the azimuth angle in degrees with respect to a central zero mark which latter mark may, for example, designate the heading of the craft upon which the oscilloscope is being used. The class B indication also includes a vertical range scale 30 showing range in miles, by way of example. The five dots 34, 36, 38, 40 and 42 represent targets from which, it is assumed, reflections are being received. The horizontal position of each dot indicates its azimuth angle with respect to the zero of the azimuth scale (craft heading or the like) and the vertical position indicates its range in miles. For example, dot 38 represents a reflecting object having an azimuth angle of 10 degrees to the left of the zero angle mark and a range from the observation point of substantially 12 miles. As previously noted, a complete radar system for providing class B indications is disclosed in the above-mentioned application of C. B. H. Feldman. Numerous other radar systems providing class B, class C and similar indications are well known to those skilled in the art.

In Fig. 2, the assembly of the deflecting windings on their common core is diagrammatically illustrated. Four windings 202 to 205, inclusive, are employed, each covering substantially a quarter section of the core. Windings 202 and 203 cover the upper and lower quarters of the core, respectively. They are paired to provide vertical deflection of the beam. Similarly, windings 204 and 205 cover the left and right quarters of the core and are paired to provide horizontal deflection of the beam. The windings of each pair are connected in series opposing relation, so that the magnetic fluxes in the core resulting from current in the two windings of a pair oppose each other and consequently leave the core and pass across the opening in the center of the core. The cathode ray is of course deflected perpendicularly with respect to the lines of flux in each instance, and the amount of deflection is determined by the strength of the magnetic flux which in turn is determined by the magnitude of the deflecting current passed through the deflecting coils. The cross-hatched segments 210 to 213, inclusive, represent permanently magnetized sections of the core which will be described in more detail in connection with Fig. 3.

In Fig. 3, the core, upon which the deflecting coils of Figs. 1 and 2 are wound, is shown in more detail. It comprises a hollow cylinder 300 which is preferably of high permeability and low reluctance, such as the well-known alloy comprising 45 parts nickel 55 parts iron, except for bars 310 to 313, inclusive, which are of magnetic material of high coercive force. Bars 310 to 313 can be, for example, of one of the commonly used group of alloys containing aluminum, nickel, cobalt and iron, well known to those skilled in the art, though any material characterized by high coercive force is suitable. The bars are permanently magnetized before assembly in the core, transversely, to a high degree, for example, to between 5,000 to 15,000 gauss in a closed magnetic (zero air gap) magnetizing circuit, with north and south polarities as indicated by the letters N and S in Fig. 3. They are then, of course, removed from the magnetizing circuit and assembled in the core as shown in Fig. 3.

The magnetized bars are paired near the top and bottom of the core as shown and are arranged symmetrically with respect to the vertical transverse axis of the core, the vertical transverse axis of each bar making an angle of the order of 22½ degrees with respect to the vertical transverse axis of the core. This angle is not critical and may be varied over an appreciable range depending upon the magnetization of the bars and the magnitude of the deflection to be produced. The bars of each pair are magnetically in "series-aiding" relation with respect to each other but the top pair is magnetically in series opposing relation with respect to the bottom pair so that, as in the case of each pair of deflecting windings, the flux will leave the core between the two pairs of bars and cross the center of the core (from right to left in accordance with the usual connection in the instance illustrated in Fig. 3). The bars are proportioned and magnetized to produce a field of such strength that the cathode ray will be depressed, for example, to the base line desired for the class B indication as illustrated in Fig. 1A, when there is no deflecting current in any of the deflecting windings. The advantages of this arrangement have been pointed out and discussed above.

The above-described arrangements are illustrative but do not, obviously, cover the full range of the possibilities of applying the invention. It can, for example, be directly applied to provide the so-called "open center" reference circle in the well-known plan position type of oscilloscope indication. This is in essence a polar diagram indication with the observation point at its center. An "open center" or small zero range reference circle concentric with the point center of the indication is employed to avoid the crowding of indications from nearby reflecting objects about the center point and to facilitate observation of the angular direction of any particular nearby object. In the plan position type of indication the observation point is as indicated above represented by the center point of the oscilloscope screen (or by the "open center" reference circle when used), range is represented by the radial distance of an indication from the center point (or from the "open center" reference circle if the latter is provided) and azimuth is represented by the angular position of the radius passing through an indication with respect to a reference radius, which latter may correspond to a selected compass bearing, such as north, or the heading of the craft, if the radar is airborne or shipborne. For such use, a core of the type illustrated by Fig. 3 is suitable when provided with a single pair of deflecting windings such as 202, 203 of Fig. 2, the latter providing the radial deflection for the radial range sweeps and the permanently magnetized core sections providing the constant off-center deflection which determines the radius of the "open-center" reference circle. Since the other pair of deflecting windings 204 and 205 are not used in this arrangement they can be omitted and windings 202 and 203 can be distributed over the entire upper and lower halves of the core, respectively, to reduce the bulk of the assembly, if desired. The entire deflection coil assembly is then mounted for rotation on the neck of the oscilloscope tube in synchronism with the rotation of the exploratory antenna of the radar system in accordance with any of the plan position indicating radar systems now well known to those skilled in the art. Plan position indicators, as employed in the radar art are discussed, for example, in the October 1945 issue of Fortune magazine, the switching on and off of the radially deflecting magnetic field mentioned therein being commonly effected by electromagnetic means, i. e., by applying a sweep wave to the winding of a deflecting coil assembly.

Numerous other arragnements can, obviously, be readily devised by those skilled in the art, within the spirit and scope of the invention. The scope of the invention is defined in the appended claims.

What is claimed is:

1. In a deflecting coil assembly for a cathode ray oscilloscope of the type which includes a toroidal core of magnetic material, with horizontal and vertical deflecting windings symmetrically arranged on said core, means for providing an initial deflection of the oscilloscope ray which comprises an even number of permanently magnetized members assembled as an integral portion of said core, one-half of said members being located diametrically opposite the other half, all of said members being symmetrically positioned with respect to one of said windings, the two groups of magnetized members being magnetically in opposition.

2. In a deflecting coil assembly for a cathode ray oscilloscope, having horizontal and vertical deflecting windings symmetrically arranged on a core, said core being a toroidal core of magnetic material including two like pluralities of permanently magnetized portions symmetrically arranged with respect to one of said windings, said portions being integrally incorporated in said core and polarized in opposition to each other whereby a portion of the flux resulting in said core from said permanently magnetized portions will cross the opening in the center of said toroidal core and produce an initial biasing deflection of the ray of said oscilloscope in one only of the deflection planes.

3. In a deflecting coil assembly for a cathode ray oscilloscope, a toroidal core of magnetic material having horizontal and vertical deflecting windings symmetrically arranged on said core, said core including two substantially like symmetrically arranged groups of permanently magnetized portions diametrically and magnetically opposed to each other.

4. In a deflecting coil assembly for a cathode ray oscilloscope a toroidal core of magnetic material having horizontal and vertical deflecting windings symmetrically arranged on said core, said core including two like pluralities of small permanently magnetized portions disposed in diametrically opposed positions with respect to each other, symmetrically arranged with respect to one of said windings, and polarized magnetically in opposition to each other.

5. In a deflecting coil assembly for a cathode ray oscilloscope a toroidal core of magnetic material, four deflecting coil windings wound on said core, each winding occupying a quarter segment of said core, each winding being paired with the diametrically opposite winding and being connected electrically in series opposing therewith, said core including an even plurality of like, permanently magnetized portions, half of said plurality of portions being symmetrically located with respect to one of said windings, the remainder of said portions being symmetrically located with respect to the winding paired with said one winding, the two halves of said magnetized portions being magnetically polarized in opposition to each other.

ADOLPH C. EKVALL.

REFERENCES CITED

The following references are of record in the file of this patent:

UNITED STATES PATENTS

| Number | Name | Date |
|---|---|---|
| 2,102,421 | Kuehni | Dec. 14, 1937 |
| 2,188,579 | Schlesinger | Jan. 30, 1940 |

OTHER REFERENCES

Maynard: "Permanent Magnets Have Four Major Jobs," pamphlet received in Division 48 May 10, 1945, a reprint from Electrical Manufacturing of November 1944. Page 1 of text only relied upon.